(12) United States Patent
Magas et al.

(10) Patent No.: US 12,116,041 B2
(45) Date of Patent: Oct. 15, 2024

(54) FRONT FACE STRUCTURAL ASSEMBLY FOR A MOTOR VEHICLE

(71) Applicant: STELLANTIS AUTO SAS, Poissy (FR)

(72) Inventors: Mihaela Maria Magas, Autrey les Cerre (FR); Ronan Breal, Bethoncourt (FR); Manaf Karkar, Bouskoura (MA)

(73) Assignee: STELLANTIS AUTO SAS, Poissy (FR)

( * ) Notice: Subject to any disclaimer, the term of this patent is extended or adjusted under 35 U.S.C. 154(b) by 0 days.

(21) Appl. No.: 18/562,907

(22) PCT Filed: May 12, 2022

(86) PCT No.: PCT/FR2022/050905
§ 371 (c)(1),
(2) Date: Nov. 21, 2023

(87) PCT Pub. No.: WO2022/269149
PCT Pub. Date: Dec. 29, 2022

(65) Prior Publication Data
US 2024/0262427 A1      Aug. 8, 2024

(30) Foreign Application Priority Data

Jun. 23, 2021    (FR) ...................................... 2106674

(51) Int. Cl.
*B62D 21/15*     (2006.01)
*B62D 25/02*     (2006.01)
(Continued)

(52) U.S. Cl.
CPC ......... *B62D 21/152* (2013.01); *B62D 25/025* (2013.01); *B62D 25/088* (2013.01); *B62D 25/16* (2013.01); *B62D 27/023* (2013.01)

(58) Field of Classification Search
CPC .. B62D 21/152; B62D 25/025; B62D 25/088; B62D 25/16; B62D 27/023
(Continued)

(56) References Cited

U.S. PATENT DOCUMENTS 7,703,805 B2 *   4/2010   Sasaki ................. B62D 21/152
                                                      296/203.02

FOREIGN PATENT DOCUMENTS

| EP | 1834862 A1 | 9/2007 | |
| FR | 2956643 A1 | 8/2011 | |
| FR | 2967965 A1 * | 6/2012 | ........... B62D 25/088 |

OTHER PUBLICATIONS

International Search Report to corresponding PCT/FR2022/050905 mailed Sep. 9, 2022.
(Continued)

*Primary Examiner* — Amy R Weisberg
*Assistant Examiner* — Dana D Ivey
(74) *Attorney, Agent, or Firm* — Sandberg Phoenix & von Gontard, PC

(57) ABSTRACT

The invention relates to a structural assembly (1) for a vehicle comprising a side rail line and an upper support cup (2) for a suspension system, the assembly comprising a wheel arch wall (3), the assembly (1) further comprising at least one metal sheet (4) shaped to form a stress path (5) extending from the side rail line towards the cup (2), the wall being arranged between the cup (2), the stress path (5) and the side rail line, the assembly (1) being characterized in that it comprises a connecting member (11) connecting the cup (2) and the stress path (5), the connecting member (11) being shaped so as to deform in a predefined manner in order to transmit at least some of the longitudinal forces generated on the stress path (5) along a transverse axis (A) of the vehicle towards the cup (2) during a small front overlap test.

5 Claims, 1 Drawing Sheet

(51) Int. Cl.
    *B62D 25/08*     (2006.01)
    *B62D 25/16*     (2006.01)
    *B62D 27/02*     (2006.01)

(58) Field of Classification Search
    USPC .................................................... 296/187.1
    See application file for complete search history.

(56) References Cited

OTHER PUBLICATIONS

Written Opinion to corresponding PCT/FR2022/050905 mailed Sep. 9, 2022.

\* cited by examiner

[Fig. 1]
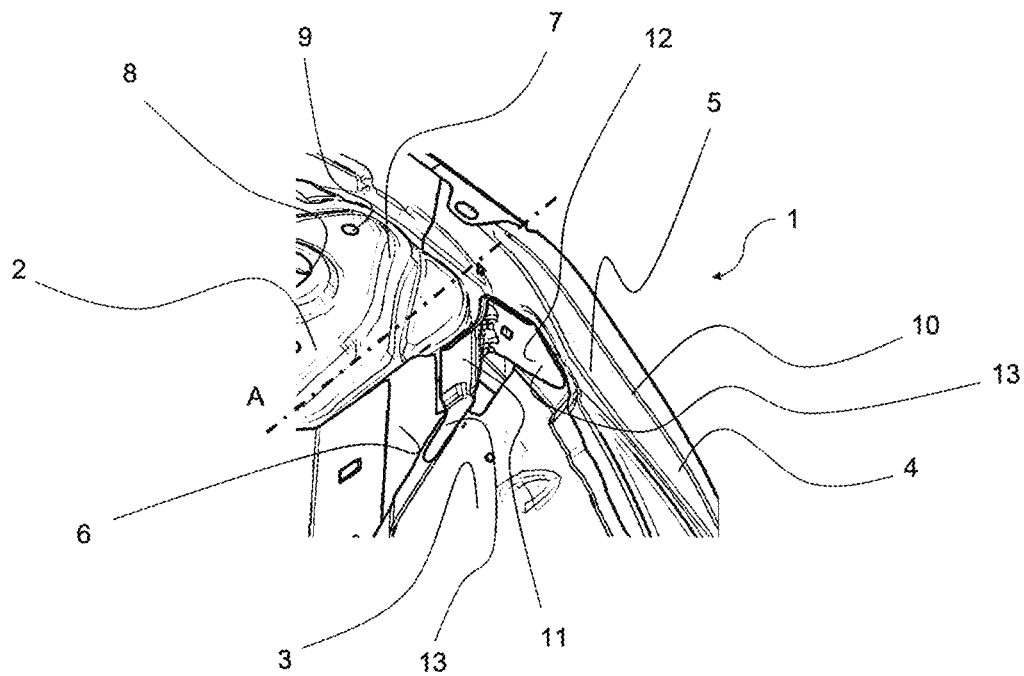
[Fig. 2]
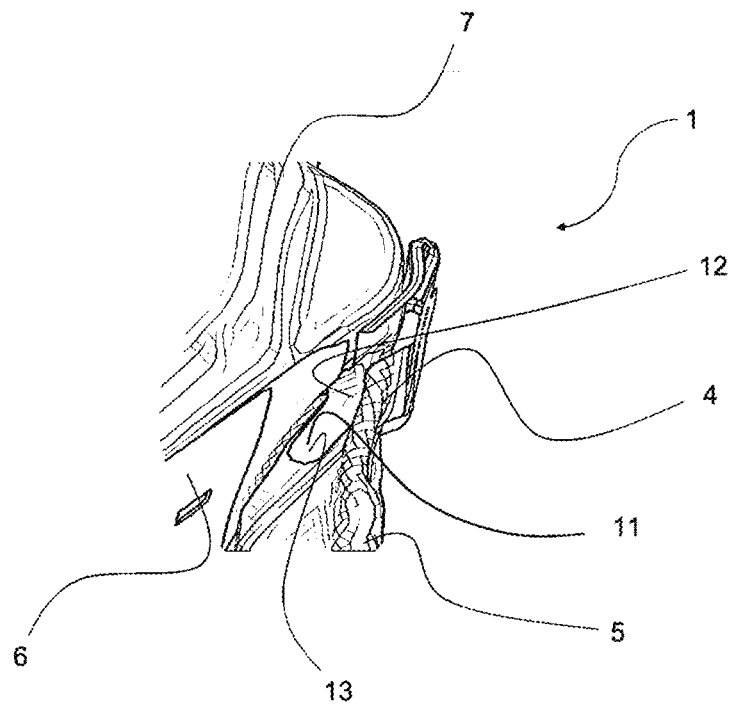

FRONT FACE STRUCTURAL ASSEMBLY FOR A MOTOR VEHICLE

CROSS-REFERENCE TO RELATED APPLICATIONS

This application is the US National Stage under 35 USC § 371 of International Application No. PCT/FR2022/050905, filed May 12, 2022, which claims the priority of French application 2106674 filed on Jun. 23, 2021, the content (text, drawings and claims) of both said applications being incorporated by reference herein.

BACKGROUND

The technical field relates to structural assemblies for motor vehicles as well as vehicles having at least one such assembly.

In terms of road safety, automobile manufacturers must take into account multiple concerns and regulations during the development of new vehicles so as, on the one hand, to ensure the safety of the vehicle passengers in the event of a collision or that of the other most vulnerable road users such as pedestrians and, on the other hand, to control the repair costs of the vehicles when they are subjected to urban impacts, called repairability impacts, experienced at low speeds of the order of 15 to 20 kilometers per hour.

For impacts at higher speeds, of the order of 50 km/h or more, vehicles are made to deform in order to absorb at least part of the energy released during the impact, so as to protect the passengers as much as possible. The behavior at the deformation of a motor vehicle, under the effect of an impact, is particularly controlled by automobile manufacturers, who are absolutely seeking to prevent the deformations experienced by the vehicle from impacting the passenger compartment and its occupants.

The various impacts that a vehicle may undergo are simulated by standardized procedures such as, for example, those described by the American organization IIHS.

A particularly demanding frontal test proposed by the IIHS is called "Small Overlap Front Test." This test is a type of frontal impact test. It consists in propelling a vehicle at a speed of 40 mph, or about 64 km/h, into a 1.5 m high rigid barrier, which strikes 25% of the front of the vehicle, on the driver's side. The test simulates the collision with an oncoming vehicle, a tree or a utility pole.

A front overlap test mainly affects the exterior edges of the vehicle and the impact forces are directly oriented towards the front wheel, the suspension system and the firewall. Thus, it is not uncommon for the wheel to be pushed rearward into the passenger compartment, in particular into the leg area, which constitutes a very harmful intrusion that can lead to serious injury to the legs and feet of the driver. Ideally, the vehicle structure must deform to cause a transverse movement of the vehicle so that the passenger compartment is not struck by the test barrier.

The majority of modern vehicles have a passive protection design based on two stress paths: a first stress path consisting of the longitudinal member or else a side rail line and a second stress path, also called the lower stress path, consisting of cradle add-ons. Some vehicles also comprise a third stress path which is arranged around the wheel housings.

Examination of the collisions between two vehicles shows that quite often the stress paths have trouble interacting with one another and thus do not manage to transmit the forces to all the elements of the vehicle structure. Furthermore, the third stress path is linked to the first stress path via the wheel arch and the latter is also attached to the body of the suspension cup. Thus, the suspension cup proves to be a weak point. The suspension cup thus often harms the deformation behavior of the vehicle during an impact in a small overlap front test. Very often, the vehicle does not offset itself enough to prevent the passenger compartment from striking the barrier. Thus, there is a need for a solution to improve the behavior of the vehicle during deformation following a small overlap front test.

SUMMARY

The object is to overcome the problems described above. In this technical context, an aim is to provide a structural assembly for a motor vehicle allowing improved offset of the vehicle during the small overlap front test. To this end, the present described devices relate to a structural assembly for a motor vehicle comprising a side rail line and an upper support cup for a suspension system of a wheel, the assembly comprising a wheel arch wall for said wheel, the assembly further comprising at least one metal sheet shaped to form a stress path extending from the side rail line towards the cup, the wheel arch wall being arranged between the cup, the stress path and the side rail line, the assembly being characterized in that it comprises a connecting member connecting the cup and the stress path, the connecting member being shaped so as to deform in a predefined manner in order to transmit at least some of the longitudinal forces generated on the stress path along a transverse axis of the vehicle towards the cup during a small overlap front test.

The described devices also relate to a vehicle comprising at least one assembly.

Thus, owing to the connecting member, the assembly makes it possible to connect the behavior of the upper support cup for a suspension system of a wheel to the stress path. In view of its shape, the connecting member makes it possible, by deforming during a small overlap front test, to generate forces and therefore deformations on the cup along a transverse axis of the vehicle. By deforming along a transverse axis of the vehicle, the cup improves the behavior of the vehicle, and in particular its lateral offset, during the small overlap front test.

In the present text, a "transverse" axis relates to an axis perpendicular to the longitudinal direction of the vehicle equipped with an assembly. According to one embodiment, the connecting member is designed to be crushed along a transverse axis of the vehicle.

According to one possibility, the connecting member comprises a stamped metal sheet having a cross section with a curved V shape.

According to one embodiment, the connecting member has two welding areas designed to attach the connecting member to the cup and the stress path, respectively.

BRIEF DESCRIPTION OF THE FIGURES

The described devices will be better understood upon reading the following detailed description, given solely by way of non-limiting example and with reference to the accompanying drawings, wherein:

FIG. 1 shows a perspective view of an assembly showing the connecting member as well as the cup and the stress path.

FIG. 2 shows a perspective view of the connecting member of FIG. 1 after an impact of a small overlap front test.

In these figures, the same references are used to designate the same elements.

DETAILED DESCRIPTION

A structural assembly 1 for a motor vehicle, shown in FIGS. 1 and 2, comprises a side rail line, not shown, an upper support cup 2 for a wheel suspension system, shown in the figures, and a wheel arch wall 3 for said wheel, shown in FIG. 1.

The assembly also comprises at least one metal sheet 4 forming a stress path 5 extending from the side rail line to the cup 2. The wheel arch wall 3 is arranged between the cup 2 towards the rear of the assembly 1, the side rail line in the lower part of the assembly 1, and the stress path 5 in the upper part. A vehicle thus comprises at least one assembly 1. The vehicle also advantageously comprises, for example, a second stress path consisting of cradle add-ons, not shown.

The cup 2 is generally a relatively thick piece of sheet metal, with a thickness of the order of 2 to 3 millimeters, due to its function of absorbing the forces of the suspension system, not shown. Thus and conventionally, the cup 2 comprises a side wall 6 formed by at least one metal sheet having a substantially frustoconical shape with a square base whose corners are rounded. The cup 2 also comprises an upper wall 7 closing the volume delimited by the side wall 6. The upper wall 7 has a passage opening 8 of a shock absorber head and attachment means 9 for attaching the shock absorber head made for example in the form of screw passage orifices provided in the cup 2.

The wheel arch wall 3 is made of sheet metal that is thinner than the cup 2, with a thickness of the order of a millimeter, sometimes locally reinforced by one or more additional reinforcing elements.

The stress path 5 has a curve 10 oriented towards the outside of the vehicle. This stress path 5 is designed to have stress inputs, during an impact of a small overlap front test, towards the cup 2 causing the loss of the curve 10 of the stress path 5.

The assembly 1 further comprises a connecting member 11, shown in FIG. 1, connecting the cup 2 and the stress path 5. The connecting member 11 is shaped to deform in a predefined manner so as to transmit at least part of the longitudinal forces, generated on the stress path 5 during an impact of a small overlap front test, towards the cup 2 along a transverse axis A of the vehicle, shown in FIG. 1. Advantageously, the connecting member 11 is designed to be crushed along the transverse axis A of the vehicle.

In the embodiment, the connecting member 11 comprises a stamped metal sheet 12 having a curved V-shaped cross section, along a horizontal plane of the vehicle. The connecting member 11 has two welding areas 13 designed to connect the cup 2, at the side wall 6, and the stress path 5, respectively, by welding.

Thus, during an impact of a small overlap front test, the stress path 5 loses its curve 10 and transmits forces along a longitudinal axis towards the cup 2. The connecting member 11 is deformed in a predefined manner so as to be crushed along the transverse axis A of the vehicle to thus transmit forces to the cup 2 along the transverse axis A.

Thus, the assembly 1, owing to its connecting member 11, causes deformations of the cup 2 along the transverse axis A, which help with the offset of the vehicle to avoid the barrier during a small overlap front test. The described devices are not limited to the embodiment of the assembly described above, only by way of example, but other embodiments can be designed by a person skilled in the art without departing from the frame and scope.

The invention claimed is:

1. A structural assembly for a motor vehicle comprising a side rail line and an upper support cup for a suspension system of a wheel, the assembly comprising a wheel arch wall for said wheel, the assembly further comprising at least one metal sheet shaped to form a stress path extending from the side rail line towards the cup, the wheel arch wall being arranged between the cup, the stress path and the side rail line, wherein the assembly comprises a connecting member connecting the cup and the stress path, the connecting member being shaped so as to deform in a predefined manner in order to transmit at least some of the longitudinal forces generated on the stress path along a transverse axis of the vehicle towards the cup during a small overlap front test.

2. The assembly according to claim 1, wherein the connecting member is designed to be crushed along the transverse axis of the vehicle.

3. The assembly according to claim 1, wherein the connecting member comprises a stamped metal sheet having a cross section with a curved V shape.

4. The assembly according to claim 1, wherein the connecting member has two welding areas designed to attach the connecting member to the cup and the stress path, respectively.

5. A vehicle comprising at least one assembly according to claim 1.

* * * * *